United States Patent [19]

Dukes

[11] Patent Number: 5,506,968
[45] Date of Patent: *Apr. 9, 1996

[54] TERMINATING ACCESS OF AN AGENT TO A SHARED RESOURCE WHEN A TIMER, STARTED AFTER A LOW LATENCY AGENT REQUESTS ACCESS, REACHES A PREDETERMINED VALUE

[75] Inventor: Glenn E. Dukes, Sunnyvale, Calif.

[73] Assignees: AT&T Global Information Solutions Company, Dayton, Ohio; Hyundai Electronics America, Milpitas, Calif.

[*] Notice: The term of this patent shall not extend beyone the expiration date of Pat. No. 5,301,332.

[21] Appl. No.: 996,992

[22] Filed: Dec. 28, 1992

[51] Int. Cl.⁶ .................. G06F 13/364; G06F 13/372
[52] U.S. Cl. .................. 395/728; 395/860; 364/228.1; 364/242.6; 364/242.91; 364/251.4
[58] Field of Search ..................... 364/200, 900, 364/725; 395/275, 200, 325

[56] References Cited

U.S. PATENT DOCUMENTS

| | | | |
|---|---|---|---|
| 3,333,252 | 7/1967 | Shimabukuro | 340/172.5 |
| 3,587,060 | 7/1971 | Quinn et al. | 395/325 |
| 3,680,054 | 7/1972 | Bunker et al. | 395/275 |
| 4,096,571 | 7/1978 | Vander Mey | 364/200 |
| 4,237,534 | 12/1980 | Felix | 364/200 |
| 4,257,095 | 3/1981 | Nadir | 364/200 |
| 4,400,771 | 8/1983 | Suzuki et al. | 364/200 |
| 4,449,183 | 5/1984 | Flahive et al. | 364/200 |
| 4,597,054 | 6/1986 | Lockwood et al. | 364/900 |
| 4,682,282 | 7/1987 | Beasley | 364/200 |
| 4,719,569 | 1/1988 | Ludemann et al. | 364/200 |
| 4,787,033 | 11/1988 | Bomba et al. | 364/200 |
| 4,814,974 | 3/1989 | Narayanan et al. | 364/200 |
| 4,831,523 | 5/1989 | Lewis et al. | 364/200 |
| 4,847,747 | 7/1989 | Smith | 395/275 |
| 4,858,116 | 8/1989 | Gillett, Jr. et al. | 364/200 |
| 4,954,948 | 9/1990 | Hira et al. | 364/200 |
| 4,969,120 | 11/1990 | Azevedo et al. | 364/900 |
| 4,987,529 | 1/1991 | Craft et al. | 364/200 |
| 4,991,084 | 2/1991 | Rodiger et al. | 364/200 |
| 5,193,193 | 3/1993 | Iyer | 395/725 |
| 5,283,902 | 2/1994 | Dorn | 395/550 |
| 5,301,332 | 4/1994 | Dukes | 395/725 |
| 5,303,362 | 4/1994 | Butts, Jr. et al. | 395/425 |

*Primary Examiner*—Thomas C. Lee
*Assistant Examiner*—Marc K. Weinstein
*Attorney, Agent, or Firm*—Wayne P. Bailey; Jack Penrod

[57] ABSTRACT

A method and apparatus for very low, in some case even zero, data latency accesses to a shared resource for devices such as disk drives and their channel formatting agents. The method and apparatus together will controllably terminate any non-low-latency access in process and then start a low latency access. Since the computer system has a group of three agents that may require low latency accesses, a special low latency arbitration method and apparatus is provided instead of the normal dynamic time loop arbitration. The low latency arbitration is call zero latency loop arbitration. The method and apparatus can actually provide zero latency data accesses for disk reads and writes in many cases. Once all low latency accesses are fulfilled, the method and apparatus allow the computer system to return to its slower, normal dynamic timed loop arbitration.

10 Claims, 7 Drawing Sheets

TERMINATING ACCESS OF AN AGENT TO A SHARED RESOURCE WHEN A TIMER, STARTED AFTER A LOW LATENCY AGENT REQUESTS ACCESS, REACHES A PREDETERMINED VALUE

BACKGROUND OF THE INVENTION

The present invention relates to a multiple processor computer system, and more particularly to a method and apparatus for controlling data transfers into and out of an input/output processor that is shared by other processors or controllers of the computer system.

Typically, a multiple processor computer system has at least one central processing unit (CPU) and one or more controllers, such as a direct memory access controller. Additionally, a multiple processor computer system has certain assets that are shared by the CPU(s) and controller(s). System buses, main memories, input/output channels and mass storage drives (MSD) are some examples of such shared assets.

Shared assets are typically shared for two reasons: to provide access to shared data, and to reduce cost by time sharing an asset among the CPU(s) instead of providing each CPU with its own respective asset.

A common problem with shared assets within a system, is how the use of a shared asset is allocated among the CPU(s) and controller(s) that need to access the shared asset. Unstructured allocation of a shared asset typically results in domination by one processor to the detriment of the other processors that need the shared asset. Structured allocation of a shared asset prevents domination of a shared process by one processor to the detriment of a competing processor or controller. Structured allocation schemes called arbitration methods are well known and widely used; however, each of the known arbitration methods has some type of limitation that reduces throughput of data to and from the shared asset.

A very simple arbitration method is to assign each processor and each controller a unique priority level. When a shared asset is available, the shared asset is allocated to the processor or controller with the highest priority level that is awaiting that asset. The problem with this type of arbitration method is that in busy systems the lowest priority processor or controller is "starved out" because it never makes it to that "highest priority level awaiting" that is allocated to the shared asset.

Another simple arbitration method is the timed loop arbitration method in which each processor or controller is automatically allocated a period of time to access the shared resource whether it needs it or not. This removes the worst "starve out" problems. This arbitration method, however, has a related problem of data latency.

Data latency can be a difficult problem for mass storage drives, especially during write operations. The conversion of the data from parallel to serial format and the generation and addition of error correcting codes takes some processing time. The actual recording of the serial data and error correcting codes onto the mass storage media takes time also. For example, if a data block in sectors 1 through 10 is to be updated and the write head is currently located over sector 3, there will be a substantial delay until sector 1 again rotates around to begin a sequential write operation.

In view of the latency problems of known arbitration methods, it is an object of the present invention to provide an arbitration method that does not starve any processor or controller out and yet has a very low data latency time for writes to a mass storage drive, as well as, other high priority operations.

It is another object of the present invention to provide an arbitration method that may be dynamically adjusted to improve the data latency between a buffer memory and a mass storage drive.

SUMMARY OF THE INVENTION

Briefly stated, in accordance with one aspect of the invention the foregoing objects are achieved by a method and apparatus for providing a low latency access to a shared resource for a group of agents of a plurality of agents, said agents within said group require low latency accesses.

The method includes the steps of: setting a low latency loop bit if a low latency access is requested by a data drive channel formatter agent; starting a timer if some other agent of the plurality of agents is currently accessing the shared resource when the low latency access is requested; terminating the access of the other agent after the timer reaches a predetermined value; providing an access by the data drive channel formatter agent; and inhibiting access to the shared resource to any other agent of the plurality of agents except data drive channel formatter agents and DRAM refresh controller agent until all outstanding low latency accesses are completed.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
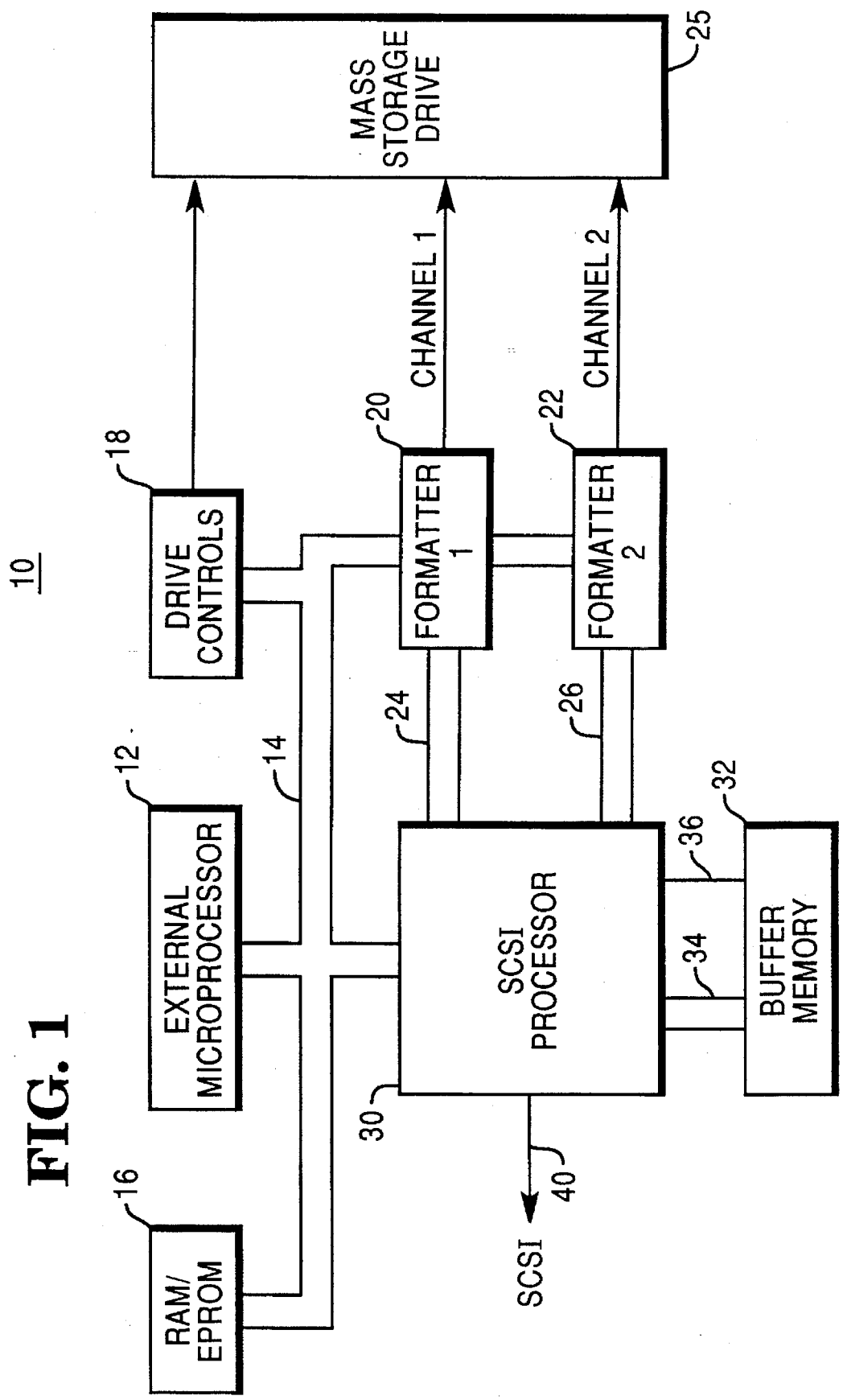
FIG. 1 is a block diagram of a computer system that includes a SCSI processor integrated circuit in accordance with the invention.

Referring now to FIG. 1, a computer system 10 is shown. Computer system 10 has a microprocessor 12 connected to a system bus 14. System bus 14 is also connected to main memory 16 which contains random access memory (RAM), and may contain read only memory (ROM) as well. System bus 14 is additionally connected to drive controller 18, formatter 20 and formatter 22. Drive controller 18 and formatters 20, 22 are connected to a data drive 25, which is a mass storage drive. Further, the system bus 14 is connected to a SCSI processor 30. The SCSI processor 30 is connected to a buffer memory 32 by address-and-data bus 34 and control bus 36. Also, SCSI processor 30 is connected to formatters 20, 22 by buses 24, 26 respectively. Further, SCSI processor 30 is connected to a SCSI2 bus 40. Connected in this manner, SCSI controller 30 can transfer data between the high speed SCSI2 bus 40 the data drive 25 using the drive controller 18 to provide the mechanics of locating the data on the disk storage media (described later with regard to FIG. 7) and one or both of the formatters 20, 22 to format the transferred data appropriately for either the storage media if the operation is a write to disk, or for the buffer memory 32 with error correction code operation (ECC) if the operation is a read from the storage media.

Figure 2:
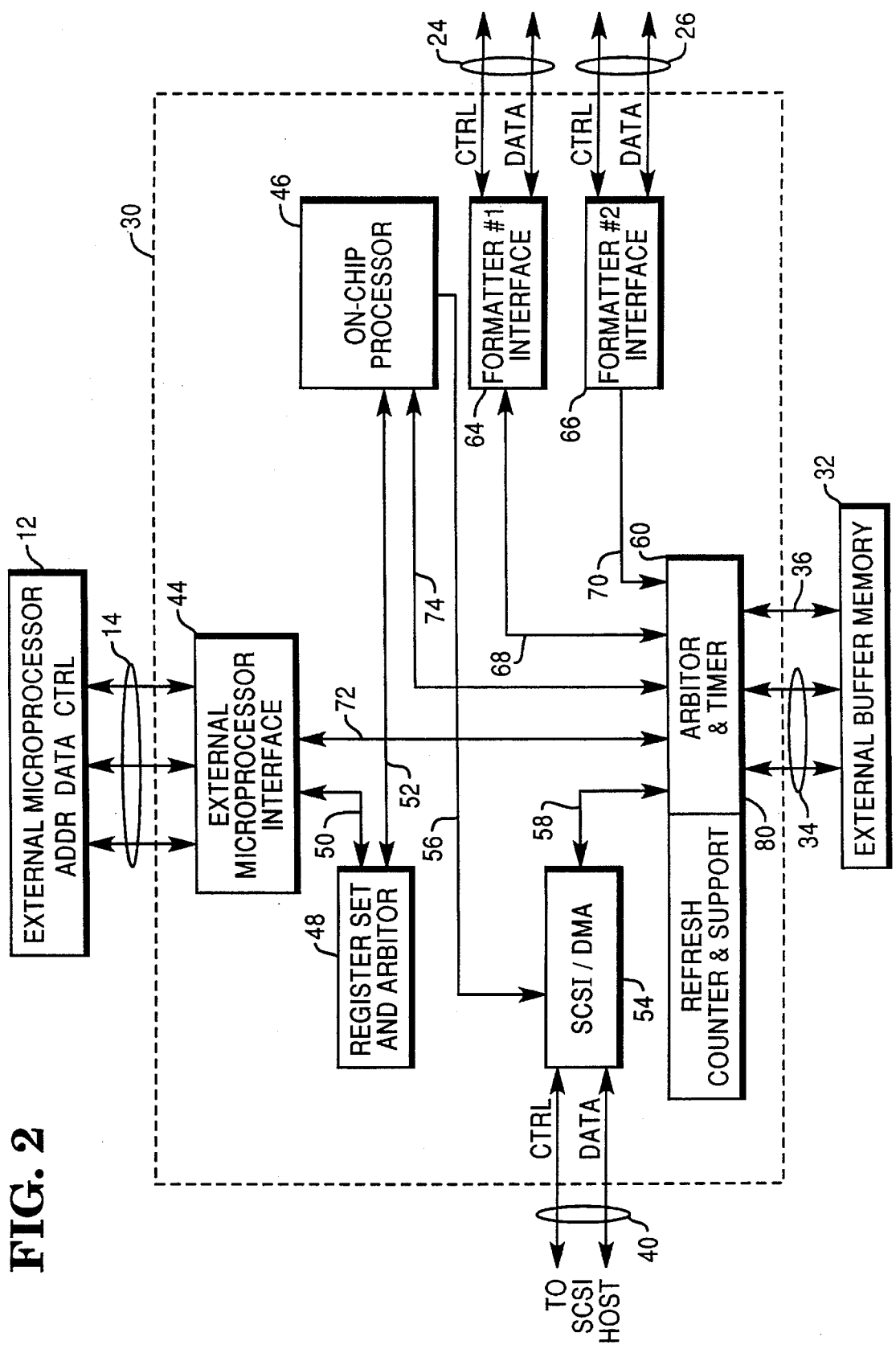
FIG. 2 is a block diagram of a digital integrated circuit for controlling access to a shared asset, such as a buffer memory, according to the present invention.

Referring now to FIG. 2, further details of the SCSI processor 30 are shown. SCSI processor 30 has an external microprocessor interface 44 which is connected to address lines, data lines and control lines of system bus 14. By external microprocessor interface 44, the microprocessor 12 can transfer data to and from addresses that are assigned to the SCSI processor 30.

SCSI processor 30 has an on-chip processor 46 that controls most of the functions of the SCSI controller 30 during normal operation. On-chip processor 46 performs general purpose processor functions for the SCSI processor 30 and also performs SCRIPTS processor functions that are specific functions for SCSI applications.

SCSI processor 30 also has a register set 48. Register set 48 has numerous registers that hold operand and status data bits for control of the SCSI processor 30. Register set 48 is connected to the external microprocessor interface 44 by bus 50. Over bus 50, microprocessor 12 can load initial values into the operating registers of the register set 48 or check the status bits in the various registers to determine if an error has occurred that requires intervention by the microprocessor 12. Register set 48 is also connected by bus 52 to on-chip processor 46. Over bus 52, on-chip processor 46 can access the operating data stored there by the microprocessor 12, e.g. data stored during initialization, and access the status information that is used to keep current on the status of the SCSI processor 30. Since both the microprocessor 12 and the on-chip processor 46 may try to access the same register of the register set 48 at the same time, the register set 48 has a simple priority register arbiter to prevent access to the same register by the microprocessor 12 and the on-chip processor 46.

As its partially name implies, the SCSI processor 30 has a SCSI-DMA controller 54 as a part thereof. SCSI-DMA controller 54 is connected to the SCSI2 bus 40 for receiving and transmitting data. SCSI-DMA controller 54 has a SCSI2 interface which performs all of the SCSI protocol at the hardware link level. This SCSI2 interface can be a standard cell, such as a sixteen bit version of a 53C80 available from Microelectronics Division of NCR Corporation, Dayton, Ohio. SCSI-DMA controller 54 is connected to on-chip processor 46 by bus 56. The on-chip processor 46 provides control of the SCSI2 interface that the interface cannot provide for itself for data transfers with the SCSI2 bus 40.

SCSI-DMA controller 54 also includes a DMA controller that is especially helpful for transferring blocks of data to or from the SCSI2 bus 40. The DMA controller logically is located between the SCSI2 interface and a buffer memory interface 60 that it is connected to by bus 58.

Buffer interface 60 is connected to external buffer memory 32 by buses 34 and 36. Through bus 58, buffer interface 60 and buses 34, 36; DMA controller portion of the SCSI-DMA controller 54 can access external buffer memory 32 in order to temporarily store data received from the SCSI2 bus 40 or to retrieve data that has been stored there to be transmitted over the SCSI2 bus 40. The buffer interface 60 will be described further below.

SCSI processor 30 has at least one formatter interface 64, and in the preferred embodiment also has a second formatter interface 66. The formatter interfaces 64, 66 are connected to external formatters 20, 22 by buses 24, 26. The formatter interfaces 64, 66 transfer multibit parallel data to or from external formatters 20,22. For a transfer to one of the formatters 20, 22, the parallel data is transformed by the formatters 20, 22 to serial data. This transformation may include the addition of error correcting code (ECC) bits into the serial data. The serial data, including any ECC bits, is subsequently stored on the data drive 25 (shown in FIG. 1). For a transfer from one of the formatters 20, 22, the serial data stream, including any ECC bits, is transformed by one of the formatters 20, 22 into parallel data words that are received over one of the buses 24, 26 by a respective formatter interface 64, 66. If a correctable error was detected in the serial bit stream, an error correcting word is transmitted from the formatter 22, 24 that transferred the parallel data stream to the respective formatter interface 64, 66. In this manner, a large quantity of data may be transmitted or received by the formatter interfaces 64, 66 with very low probability of error.

Formatter interfaces 64, 66 are connected by buses 68, 70, which are internal buses, to buffer interface 60. By buses 68, 70, buffer interface 60 and buses 34, 36, large quantities of data may be transferred from the buffer memory 30 and the data drive 25 (shown in FIG. 1). Buffer memory 30 can be used to store blocks of data to be transferred between the formatter interfaces 64, 66 of SCSI processor 30 and the data drive 25. Similarly, ECC data may be transferred between the formatter interfaces 64, 66 and the formatters 20, 22 and transferred across buses 68, 70 through buffer interface 60 to buffer memory 32.

Buffer interface 60, besides being connected to the SCSI-DMA controller 54 by bus 58 and formatter interfaces 64, 66 by buses 68, 70 respectively, is connected to the external microprocessor interface 44 by bus 72 and to the on-chip processor 46 by bus 74. This means that at sometime in typical operation accesses to the buffer memory 32 through buffer interface 60 may be requested by microprocessor 12, on-chip processor 46, SCSI-DMA controller 54 and formatters 20, 22. Hereinafter, microprocessor 12, on-chip processor 46, SCSI-DMA controller 54 and formatters 20, 22 shall be collectively referred to as agents. Further, if the buffer memory 32 is a dynamic random access memory that requires periodic refreshing, then a refresh access request will occur also.

Sometimes, two or more of these requests may occur at the same time, or two or more requests may overlap which means that one request for access will have to wait until the current access is ended. To manage all these requests, buffer interface 60 includes an arbiter and timer circuit 80 that provides a dynamic timed loop arbitration and follows a timed loop arbitration method to provide normal access to any of the agents 12, 20, 22, 46, 54. The dynamic timed looped arbitration method and circuit are the subjects of a co-pending U.S. Patent application entitled METHOD AND APPARATUS FOR A DYNAMIC TIMED LOOP ARBITRATION, also by Glenn Dukes and commonly assigned to NCR Corporation, Dayton, Ohio, which application is hereby incorporated by reference.

During normal operation, the dynamic timed loop arbitration method and apparatus limit data latency to acceptable levels; however, if a zero latency access is necessary for system performance, normal operation of the dynamic timed loop arbitration method and apparatus is temporarily bypassed in favor of a lower latency method and apparatus according to one embodiment of the present invention. To provide this low or zero data latency, buffer interface 60 also provides a zero latency loop, ZLL, arbitration method and a zero latency loop, ZLL, apparatus.

Figure 3:
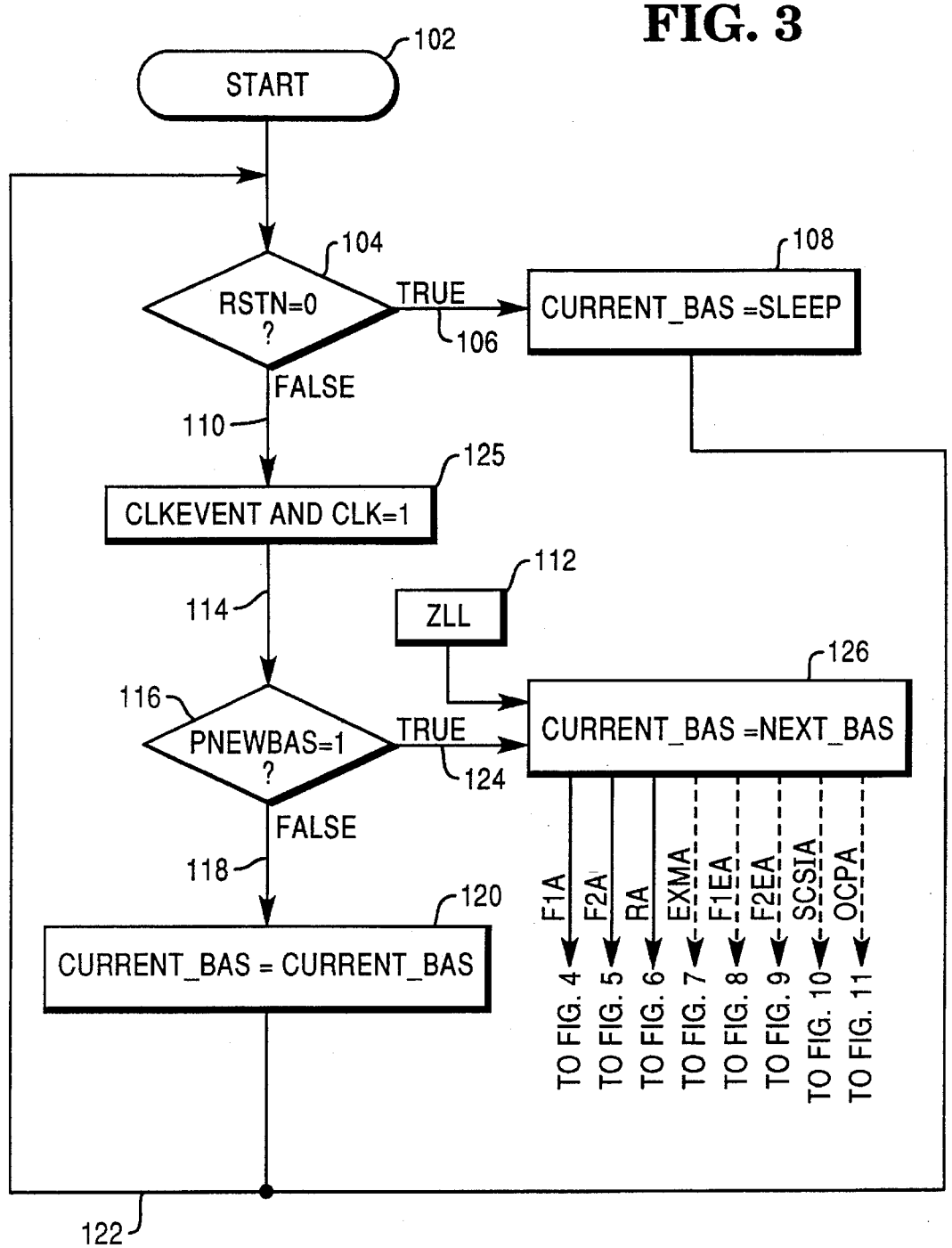
FIG. 3 is a flow chart illustrating a method for providing zero latency access to a shared asset according to the present invention.

Referring now to FIG. 3, the method of accessing a shared asset, such as buffer memory 32 shown in FIG. 2, by an agent that has a low latency requirement, such as formatters 20, 22 shown in FIG. 2, and the refresh portion of buffer arbiter 60, will be described.

Assuming a non-active start state 102 the method 100 sequences to an action 104 where a reset bit (RSTN) is tested to see if it is asserted, i.e. if a reset is commanded. If a reset is not commanded, the method follows path 106 to the action at 108, where the current buffer arbiter state (current_bas) is set to the sleep state. The sleep state is terminated synchronously. After awakening, the method returns to the action at 104 to test again for a reset state.

If RSTN does not equal zero, then the method follows path 110 to action 112 where the clock signal (CLK) is equal to logic 1, after which the method 100 follows path 114 to action 116. Action 116 tests a process new buffer arbiter state (PNEWBAS) to determine if a new buffer arbiter state is required. If there is no need to process a new buffer arbiter state, i.e. PNEWBAS does not equal 1, then the method 100 follows path 118 to action 120 where current_bas is assigned the value of itself, i.e. the current_bas value does not change. After action 120, method 100 follows path 122 to the action 104, where the RSTN bit is tested.

If it is necessary to process a new buffer arbiter state, i.e. PNEWBAS is equal to 1, then the method 100 follows path 124 to action 126 where current_bas is assigned the value of the next buffer arbiter state (next_bas). The next buffer arbiter state signal has at least eight possible states, the state of which indicates which agent has current control of the shared buffer memory and also indicates the arbitration scheme that will be followed to determine the subsequent controlling agents from a group of one or more currently requesting agents.

The next_bas that is assigned to current_bas at action 126 is determined by selecting the state that corresponds to the highest priority state of all agents actively requesting access to the shared buffer memory. During dynamic timed loop arbitration of the previously mentioned patent application formatter 1 interface access (F1A) is requested by setting F1REQ, formatter 2 interface access (F2A) is requested by setting F2REQ, refresh memory access (RA) is requested by setting RREQ, external microprocessor access (EXMA) is requested by setting EXMREQ, formatter 1 error access (FLEA) is requested by setting F1EREQ, formatter 2 error access (F2EA) is requested by setting F2EREQ, SCSI access (SCSIA) is requested by setting SCSIREQ, and on-chip processor access (OCPA) is requested by setting OCPREQ. However, if formatter 1 or formatter 2 requests a zero latency access, zero latency loop (ZLL) flag 125 is set and EXMREQ, F1EREQ, F2EREQ, SCSIREQ, and OCREQ will be disabled (indicated by the dashed lines in FIG. 3) as long as the ZLL flag is set. The remainder of this description will be concerned with zero latency loop arbitration and operation. After the priority determination is made, logic processing determines subsequent next_bas states. From action 126, method 100 branches to FIG. 4 if current_bas is F1A, FIG. 5 if current_bas is F2A, and FIG. 6 if current_bas is RA.

Figure 4:
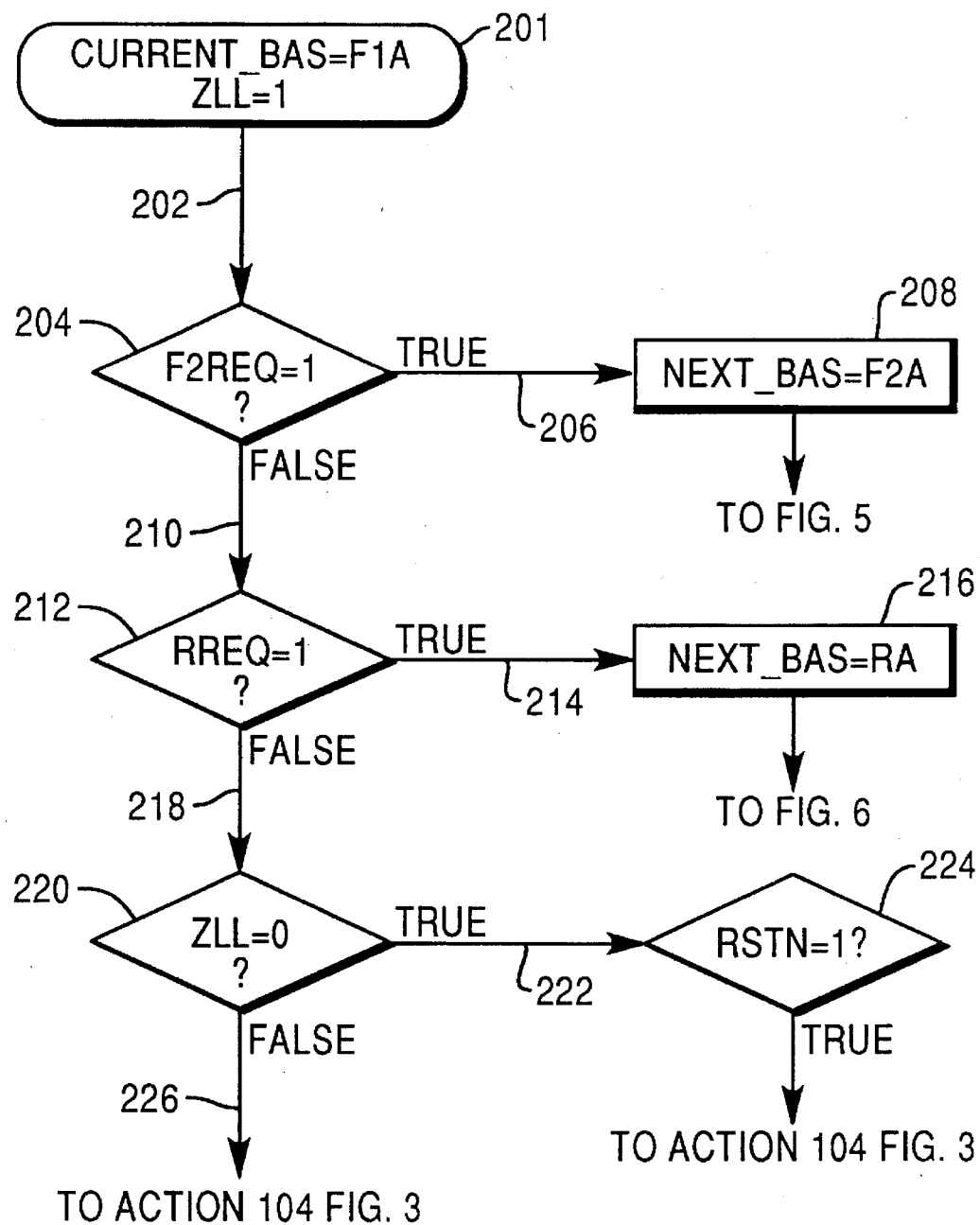
FIGS. 4–6 are flow charts illustrating branch methods that may be followed to provide zero latency accesses.

FIG. 4 shows branch method 200 of method 100. Branch method 200 starts with current_bas equal to F1A, which means that the current buffer arbiter state is a formatter 1 interface access. Also, branch method 200 starts with ZLL equal to 1, which means that a zero latency loop arbitration has been requested. Such zero latency loop arbitrations are requested to provide low or zero latency data accesses for writing data to data device 24 (shown in FIG. 1) by either of the formatters 20, 22 (shown in FIG. 1).

The branch method 200 starts at state 201 where formatter 1 interface makes an access. Formatter 1 interface is allowed at least 35 clock cycles for an access (37 clocks if a memory page boundary is crossed during the access). A timer within buffer interface 60 is started if another agent asserts a request during the 35 to 37 clock cycle access. This timer keeps track of the clock pulses. If after one access cycle, neither formatter 2 interface nor the refresh circuit has requested access to the shared buffer memory, formatter 1 interface is allowed to remain at state 201 until all of the data of the current transaction have been transferred. Once the transaction is over, the access is completed, the control of the shared buffer is relinquished and the branch method proceeds along path 202 to the action 204. Similarly, if the timer time period is reached and either formatter 2 interface or refresh circuit is requesting access to the shared buffer, the access of formatter 1 interface is halted and the branch method proceeds along path 202 to the action 204.

Action 204 tests to see if F2REQ has been set to logic 1, i.e. if formatter 2 interface is requesting access to the shared buffer. If F2REQ is set to logic 1, branch method 200 follows path 206 to action 208. Action 208 assigns next_bas as F2A, which means that the next buffer arbiter state is a formatter 2 interface access, and the method continues to branch method 300 shown in FIG. 5. If F2REQ is not set to logic 1, i.e. formatter 2 interface is not requesting access to the shared buffer, then branch method 200 follows path 210 to action 212.

Action 212 tests to see if RREQ has been set to logic 1, i.e. if the refresh circuit is requesting access to the shared buffer. If RREQ is set to logic 1, branch method 200 follows path 214 to action 216. Action 216 assigns next_bas as RA, which means that the next buffer arbiter state is a refresh access, and the method continues to branch method 400 shown in FIG. 6. If RREQ is not set to logic 1, i.e. if the refresh circuit is not requesting access to the shared buffer, then branch method 200 follows path 218 to action 220.

Action 220 tests to see if ZLL has been set to logic 0, i.e. if the zero latency loop arbitration has been completed. If ZLL is set to logic 0, branch method 200 follows path 222 to action 224. Action 224 assigns RSTN as 1, which means that the arbiter is reset to a dynamic timed loop arbitration method, and the method continues to action 104 shown in FIG. 3. If ZLL is not set to logic 0, i.e. somehow the zero latency loop flag is still set, then branch method 200 follows path 226 to action 104. Thus, branch method 200 progresses to FIG. 5, FIG. 6, or FIG. 3.

Figure 5:
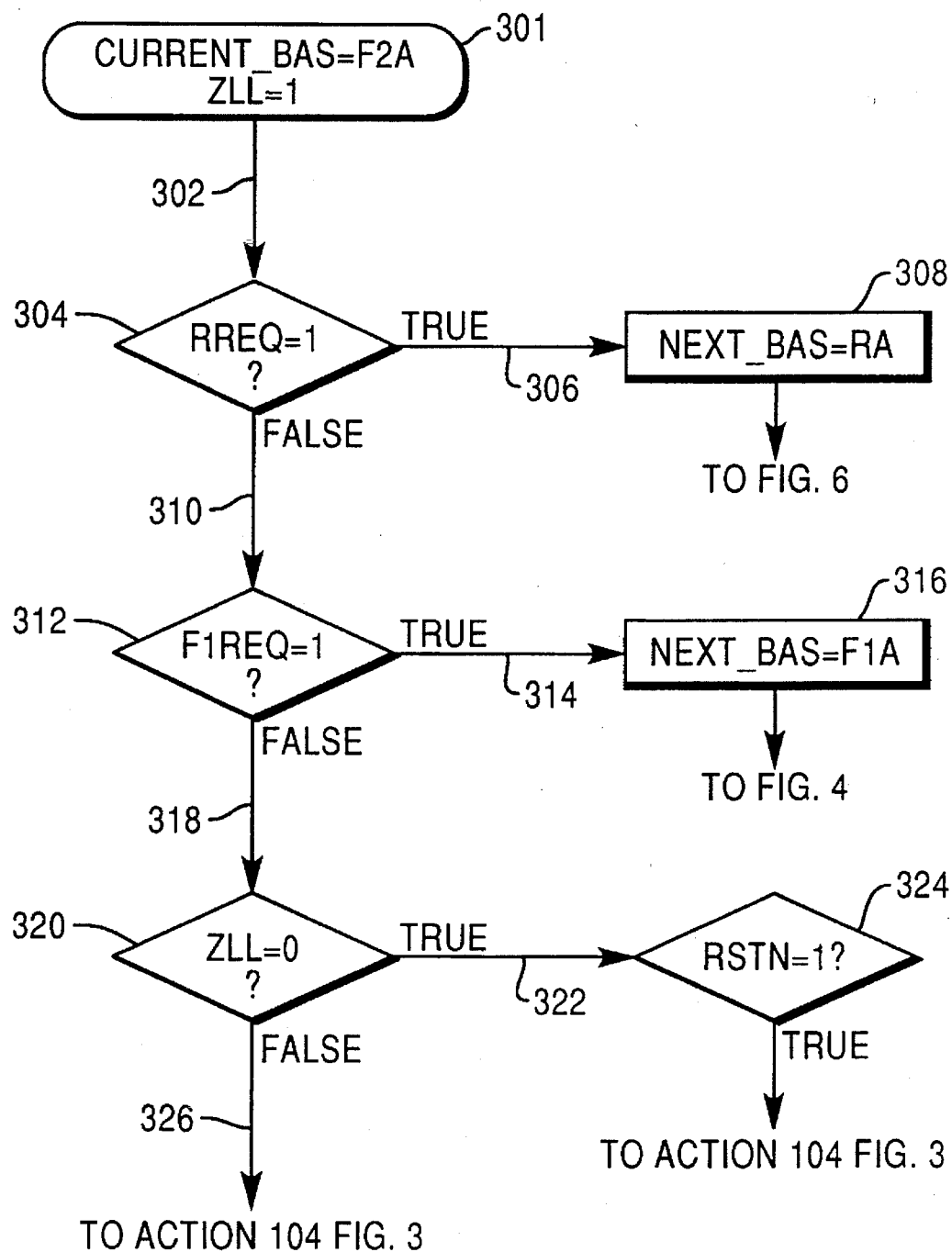

Referring now to FIG. 5, a branch method 300 of method 100. Branch method 300 starts with current_bas equal to F2A, which means that the current buffer arbiter state is a formatter 2 interface access. Also, branch method 300 starts with ZLL equal to 1, which means that a zero latency loop arbitration has been requested.

The branch method 300 starts at state 301 where formatter 2 interface makes an access. Formatter 2 interface is allowed at least 35 clock cycles for an access (37 clocks if a memory page boundary is crossed during the access). A timer within buffer interface 60 keeps track of the clock pulses. If after one access cycle, neither the refresh circuit nor formatter 1 interface has requested access to the shared buffer memory, formatter 2 interface is allowed to remain at state 301 until all of the data of the current transaction have been transferred. Once the transaction is over, the access is completed, the control of the shared buffer is relinquished and the branch method proceeds along path 302 to the action 304. Similarly, if the timer time period is reached and either the refresh circuit or formatter 1 interface is requesting access to the shared buffer, the access of formatter 2 interface is halted and the branch method proceeds along path 302 to the action 304.

Action 304 tests to see if RREQ has been set to logic 1, i.e. if the refresh circuit is requesting access to the shared buffer for a refresh cycle. If RREQ is set to logic 1, branch method 300 follows path 306 to action 308. Action 308 assigns next_bas as RA, which means that the next buffer arbiter state is a refresh access, and the method continues to branch method 400 shown in FIG. 6. If RREQ is not set to logic 1, i.e. the refresh circuit is not requesting access to the shared buffer, then branch method 300 follows path 310 to action 312.

Action 312 tests to see if F1REQ has been set to logic 1, i.e. if formatter 1 interface is requesting access to the shared buffer. If F1REQ is set to logic 1, branch method 300 follows path 314 to action 316. Action 316 assigns next_bas as F1A, which means that the next buffer arbiter state is a formatter 1 interface access, and the method continues to branch method 200 shown in FIG. 4. If F1REQ is not set to logic 1, i.e. formatter 1 interface is not requesting access to the shared buffer, then branch method 300 follows path 318 to action 320.

Action 320 tests to see if ZLL has been set to logic 0, i.e. if the zero latency loop arbitration has been completed. If ZLL is set to logic 0, branch method 300 follows path 322 to action 324. Action 324 assigns RSTN as 1, which means that the arbiter is reset to a dynamic timed loop arbitration method, and the method continues to action 104 shown in FIG. 3. If ZLL is not set to logic 0, i.e. somehow the zero latency loop flag is still set, then branch method 300 follows path 326 to action 104. Path 326, like path 226, takes an unusual set of circumstances to get to, but it is included for such unusual circumstances. Thus, branch method 300 progresses to FIG. 6, FIG. 4, or FIG. 3.

Figure 6:
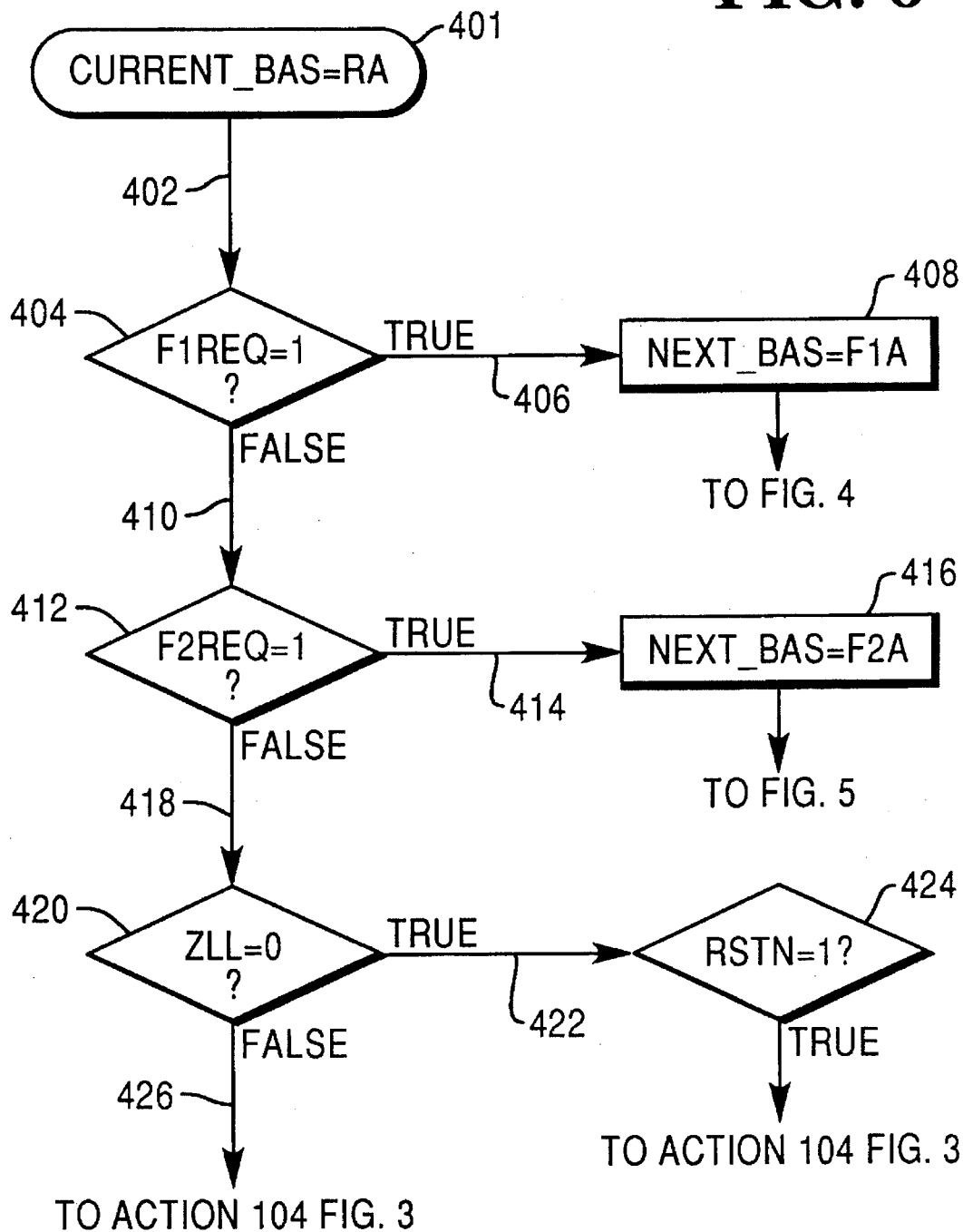

Referring now to FIG. 6, a branch method 400 of method 100 is shown. Branch method 300 starts with current_bas equal to RA, which means that the current buffer arbiter state is a refresh access. Also, branch method 400 starts with ZLL equal to 1, signifying that a zero latency loop arbitration has been requested.

The branch method 400 starts at state 401 where the refresh circuit makes an access. The refresh circuit is allowed to refresh one address of the shared buffer RAM and then it terminates its access. As mentioned above, after each access a refresh timer or counter is set such that in a set period of time a subsequent refresh access will be requested and accomplished. Once the address has been refreshed, the address counter is advanced and the access is completed. At this point control of the shared buffer is relinquished and the branch method 400 proceeds along path 402 to the action 404.

Action 404 tests to see if F1REQ has been set to logic 1, i.e. if formatter 1 interface is requesting access to the shared buffer. If F1REQ is set to logic 1, branch method 400 follows path 406 to action 408. Action 408 assigns next_bas as F1A, which means that the next buffer arbiter state is a formatter 1 interface access, and the method continues to branch method 200 shown in FIG. 4. If F1REQ is not set to logic 1, i.e. formatter 1 interface is not requesting access to the shared buffer, then branch method 400 follows path 410 to action 412.

Action 412 tests to see if F2REQ has been set to logic 1, i.e. if formatter 2 interface is requesting access to the shared buffer. If F2REQ is set to logic 1, branch method 400 follows path 414 to action 416. Action 416 assigns next_bas as F2A, which means that the next buffer arbiter state is a formatter 2 interface access, and the method continues to branch method 300 shown in FIG. 5. If F2REQ is not set to logic 1, i.e. if formatter 2 interface is not requesting access to the shared buffer, then branch method 400 follows path 418 to action 420.

Action 420 tests to see if ZLL has been set to logic 0, i.e. if the zero latency loop arbitration has been completed. If ZLL is set to logic 0, branch method 400 follows path 422 to action 424. Action 424 assigns RSTN as 1, which means that the arbiter is reset to a dynamic timed loop arbitration method, and the method continues to action 104 shown in FIG. 3. If ZLL is not set to logic 0, i.e. somehow the zero latency loop flag is still set, then branch method 400 follows path 426 to action 104. Path 426, like paths 226 and 326, takes an unusual set of circumstances to get to, but it is included for such unusual circumstances. Thus, branch method 400 progresses to FIG. 4, FIG. 5, or FIG. 3.

As long as the ZLL flag is set, the method 100 and branch methods 200, 300, 400, which are modules thereof, will continue to control the accesses among the refresh circuit portion of buffer interface 60 and low data latency requesters: formatter 1 interface 64 and formatter 2 interface 66 (all shown in FIG. 2). When both formatter 1 and formatter 2 interfaces 64, 66 are finished requesting access to the shared buffer 32, then the ZLL flag is reset and the zero latency loop arbitration method 100 is completed. When the zero latency loop arbitration method is completed, the buffer interface 60 changes to the method described in the co-pending U.S. Patent application entitled METHOD AND APPARATUS FOR A DYNAMIC TIMED LOOP ARBITRATION mentioned previously.

Figure 7:
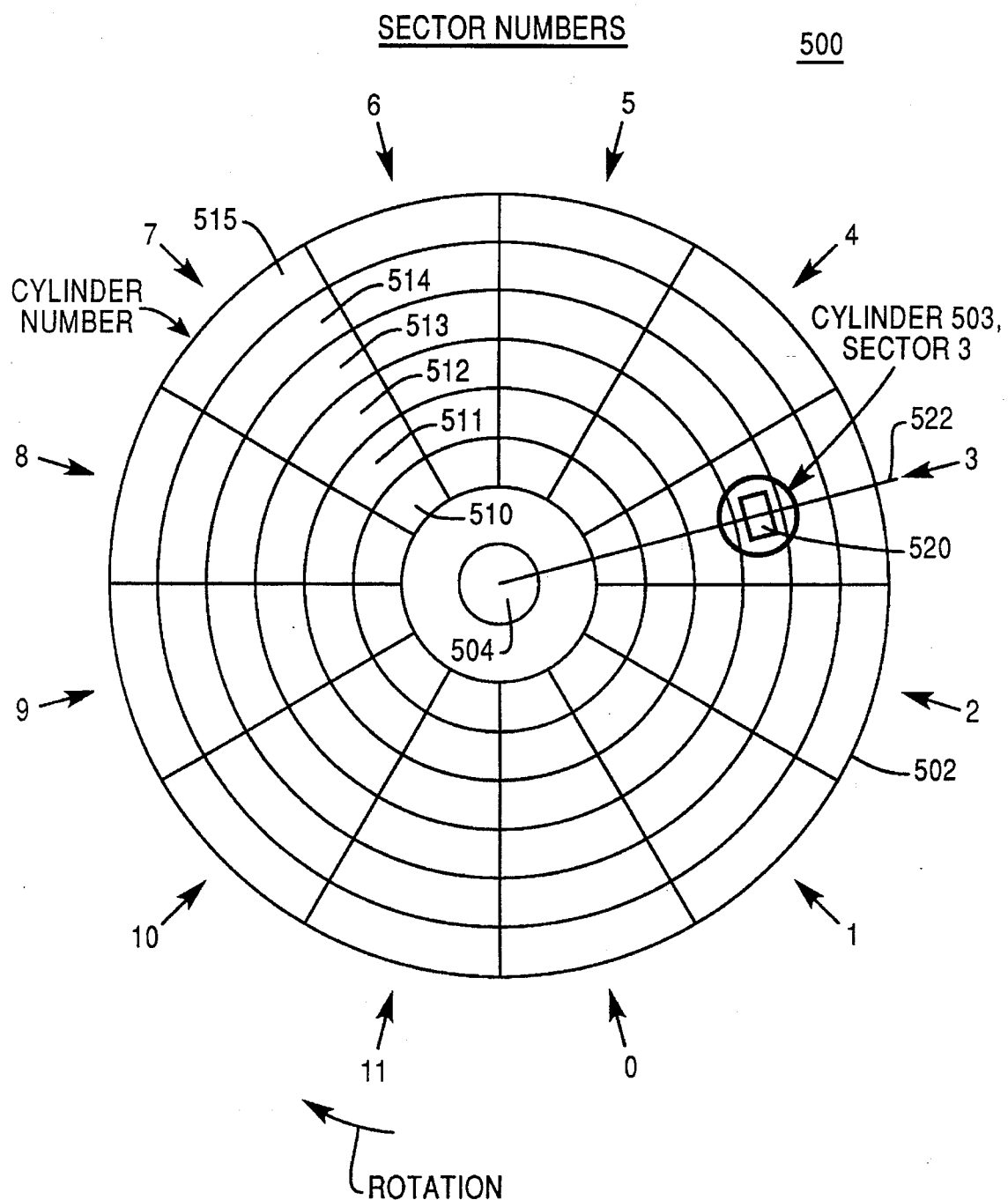
FIG. 7 is a simplified diagram of a mass storage drive.

Referring now to FIGS. 1 and 7, a zero latency access to buffer memory 32 will be described. A typical zero latency access to the buffer memory 32 is an access to write to the data drive 25. Data drive 25 is a writable disk drive 500 in the embodiment shown in FIG. 7. The disk drive 500 has a disk 502 upon which data from either formatter 1 20 or formatter 2 24 can be written using magnetic, optical, magneto-optical or similar storage technique. Disk 502 spins around hub 504. Disk 502 is logically divided into radially spaced cylinders 510–515 and each of these cylinders is divided into 12 parts, sectors 0–11 A read/write head 520 reads and/or writes data to the disk 502, typically to a plurality of sectors that are spaced around the disk 502. Read/write head 520 moves radially along support arm 522 in order to change between cylinders 510–515. Mechanisms to move the read-write head 520 between cylinders is well known so details of such a mechanism will be omitted for simplification.

In a write operation to cylinder 513, sectors 0–10 for example, read-write head 520 reads the headers of the sectors that pass below it, which is sector 3 in FIG. 7. So the desired write to cylinder 513, sectors 0–10 would take ⅔ of a rotation before a write to cylinder 513 sector 0 can begin. If the write access that writes to the initial sector 0 of cylinder 513 and then writes sequentially to sectors 1–10 would take 1 7/12 rotations of disk 502. However, if the write operation can begin in the middle of the data and write the data in the sector that is immediately under the read-write head 520, sector 3 of cylinder 513, sequentially write data to sectors 4–10, and then complete the write operation by writing sectors 0–2 of cylinder 513 as these sectors rotate beneath the read-write head 520, the write operation is completed with the lowest possible data latency and zero latency if writing to any sector passing directly under the read-write head 520.

To provide zero latency writes, the data to be written is stored in transfer tables in shared buffer memory 32. When the read portion of the read-write head reads the upcoming the identification code of the sector, the SCSI processor 30 looks up the memory address of the data that is to be written to this sector. Additionally, the first few bytes of data for that sector are pre-fetched from the shared buffer memory 32 so the initial bytes can be immediately transferred to the sector when it is immediately below the write portion of the read-write head 520. As the pre-fetched bytes are written to their respective sector, the remaining byte for that sector are accessed from shared buffer memory 32. Without the zero latency loop arbitration method 100 shown in FIGS. 3–6, to limit the arbitration for the shared buffer memory to only formatter 1, formatter 2 and the refresh circuit, the access time for formatter 1 or formatter 2 to access a transfer table would be too long. By using the method 100 and the buffer interface arbiter 60, accesses to buffer memory 32 can be held to a worst case delay of 44 clock pulses of a 40 MHz clock, or 1.1 microseconds in a preferred embodiment. This allows zero latency write operation to the disk 502 as desired. Such high speed transfers are very useful for transferring data between a SCSI bus and a mass storage device.

Thus, it will now be understood that there has been disclosed a method and apparatus for a SCSI processor integrated circuit that can perform data accesses to a shared buffer memory with very low data latency. While the invention has been particularly illustrated and described with reference to preferred embodiments thereof, it will be understood by those skilled in the art that various changes in form, details, and applications may be made therein. For example multiple head/multiple disk storage drives may be used. It is accordingly intended that the appended claims shall cover all such changes in form, details and applications which do not depart from the true spirit and scope of the invention.

What is claimed as new and desired to be secured by Letters Patent of the U.S. is:

1. A method of providing a low latency access to a shared resource for a group of low latency agents of a plurality of agents, comprising the steps of:

setting a low latency request bit if an access is requested by a low latency agent;

starting a timer if some other agent of the plurality of agents is currently accessing the shared resource when the low latency access is requested;

after said timer reaches a predetermined value, terminating access of said other agent and providing an access by said low latency agent; and inhibiting access to said shared resource by any other agent of said plurality of agents except said low latency agents until all outstanding low latency agent accesses are completed.

2. A method of providing a low latency access to a shared resource according to claim 1, further comprising the step of:

arbitrating among said low latency agents if said low latency request bit is set.

3. A circuit for controlling access to a shared resource among a plurality of agents, said plurality of agents including a group of low latency agents that require low latency accesses, comprising:

means for setting a low latency request bit if an access is requested by a low latency agent;

a timer;

means for starting said timer if some other agent of the plurality of agents is currently accessing the shared resource when the low latency access is requested;

means for terminating access of said other agent after a predetermined time period has expired;

means for providing an access by said low latency agent; and means for inhibiting access to said shared resource by any other agent of said plurality of agents except said low latency agents until all outstanding low latency agent access requests are fulfilled.

4. A circuit for controlling access to a shared resource among a plurality of agents according to claim 3, further comprising:

means for arbitrating among said low latency agents if said low latency request bit is set.

5. The method of claim 1 wherein said low latency agents comprise a data formatter agent and a DRAM refresh controller agent.

6. The method of claim 1 wherein said low latency agent is a data formatter agent.

7. The circuit of claim 3 wherein said low latency agents comprise a data formatter agent and a DRAM refresh controller agent.

8. The circuit of claim 3 wherein said low latency agent is a data formatter agent.

9. A method of providing a low latency access to a shared resource for a group of low latency agents of a plurality of agents, comprising the steps of:

requesting an access by a low latency agent;

activating a timer if some other agent of the plurality of agents is currently accessing the shared resource when access is requested by the low latency agent;

after the timer reaches a predetermined value, terminating access of the other agent and providing access by the low latency agent; and inhibiting access to the shared resource by any other agent of said plurality of agents except the low latency agents until all outstanding low latency agent accesses are completed.

10. A circuit for controlling access to a shared resource among a plurality of agents, said plurality of agents including a group of low latency agents that require low latency accesses, comprising:

means for requesting an access by a low latency agent;

means for activating a timer if some other agent of the plurality of agents is currently accessing the shared resource when access is requested by the low latency agent;

means for terminating access of the other agent and providing access by the low latency agent after the timer reaches a predetermined value; and means for inhibiting access to the shared resource by any other agent of the plurality of agents except the low latency agents until all outstanding low latency agent access requests are fulfilled.

* * * * *